(12) United States Patent
Stockdale

(10) Patent No.: US 6,313,223 B1
(45) Date of Patent: Nov. 6, 2001

(54) RUBBERY HEAT RESISTANT COMPOSITION

(75) Inventor: Michael Kenneth Stockdale, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/443,574

(22) Filed: Nov. 19, 1999

(51) Int. Cl.⁷ .................................................. C08L 35/02
(52) U.S. Cl. ........................ 525/194; 525/195; 525/226; 525/230
(58) Field of Search .................................. 525/226, 230, 525/194, 195

(56) References Cited

U.S. PATENT DOCUMENTS

| | | | |
|---|---|---|---|
| 5,053,450 | * | 10/1991 | Coran ..................................... 525/230 |
| 5,612,418 | * | 3/1997 | Manley et al. ......................... 525/230 |
| 5,616,651 | * | 4/1997 | Nino et al. ............................. 525/230 |
| 5,767,173 | * | 6/1998 | Ngoc et al. ............................ 525/230 |
| 6,187,867 | * | 2/2001 | Rau et al. .............................. 525/230 |

* cited by examiner

Primary Examiner—Bernard Lipman
(74) Attorney, Agent, or Firm—Alvin T. Rockhill

(57) ABSTRACT

This invention relates to a polymeric composition that can be molded into rubbery articles having excellent oil resistance and excellent heat resistance. The properties of the polymeric composition of this invention are similar to those of hydrogenated nitrile rubber. However, the polymeric compositions of this invention offer a significant economic advantage over traditional hydrogenated nitrile rubbers. This is because the polymeric compositions of this invention are made by blending hydrogenated nitrile rubber with a much less expensive rubbery polymer. Unexpectedly, the physical properties of the polymeric blends of this invention are very similar to those of pure hydrogenated nitrile rubbers. This invention more specifically discloses a polymeric composition having excellent heat and excellent oil resistance which is comprised of (1) from about 2 to about 50 parts by weight of a rubbery polymer which is comprised of repeat units which are comprised of (a) butyl acrylate, (b) at least one member selected from the group consisting of methyl methacrylate, ethyl methacrylate, methyl acrylate and ethyl acrylate, (c) acrylonitrile, (d) styrene, and (e) a crosslinking agent; and (2) from about 50 to about 98 parts by weight of a hydrogenated nitrile rubber.

20 Claims, No Drawings

RUBBERY HEAT RESISTANT COMPOSITION

BACKGROUND OF THE INVENTION

Hydrogenated nitrile rubbers offer the advantage of being resistant to oxidative degradation at high temperatures and also offer outstanding oil resistance. By virtue of these properties hydrogenated nitrile rubbers have excellent characteristics for utilization in applications where high temperatures and organic solvents, such as oils, are encountered. For instance, hydrogenated nitrile rubbers are frequently utilized in automotive applications where it is critical to have good heat resistance and good oil resistance. Accordingly, hydrogenated nitrile rubbers are frequently employed in belts, seals, gaskets, and hoses for internal combustion engines.

Hydrogenated nitrile rubber is made by hydrogenating the double bonds of conventional nitrile rubber. U.S. Pat. No. 4,452,950 discloses a process for hydrogenating the double bonds in a nitrile rubber while it is in latex form. The process of U.S. Pat. No. 4,452,950 is carried out in the presence of hydrazine, an oxidizing agent, and a metal ion initiator. Unfortunately, it is expensive to hydrogenate the double bonds of a nitrile rubber regardless of the specific hydrogenation procedure used. Hydrogenated nitrile rubber currently sells at a price of about $12–14 per pound. High cost has greatly limited the commercial utilization of hydrogenated nitrile rubber even though it has excellent physical and chemical properties for a wide variety of applications.

Sunigum® rubber is currently being sold by The Goodyear Tire & Rubber Company at a small fraction of the price of hydrogenated nitrile rubber. Sunigum® rubber is comprised of repeat units which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene, and (e) a crosslinking agent. Rubbery polymers of this type can be made by utilizing a free radical emulsion polymerization technique, such as the technique described in U.S. Pat. Nos. 5,380,785, 5,616,651, 5,674,933 or 5,767,173.

SUMMARY OF THE INVENTION

The present invention relates to a blend of hydrogenated nitrile rubber with Sunigum® rubber that has physical and chemical properties that are similar to those of hydrogenated nitrile rubber by itself The polymeric blend of this invention offers the advantage of being much less expensive than pure hydrogenated nitrile rubber. Thus, significant cost savings can be realized by utilizing the polymeric composition of this invention in applications where heat resistance and oil resistance are required.

This invention more specifically discloses a polymeric composition having excellent heat and oil resistance which is comprised of (1) from about 2 to about 50 parts by weight of a rubbery polymer which is comprised of repeat units which are comprised of (a) butyl acrylate, (b) at least one member selected from the group consisting of methyl methacrylate, ethyl methacrylate, methyl acrylate and ethyl acrylate, (c) acrylonitrile, (d) styrene, and (e) a crosslinking agent; and (2) from about 50 to about 98 parts by weight of a hydrogenated nitrile rubber.

In applications where high tensile strength is required it is highly advantageous for the polymeric composition of this invention to be cured with a peroxide cure system. By utilizing such peroxide cure systems, tensile strengths after heat aging that approach those of unblended hydrogenated nitrile rubbers can be attained. The present invention accordingly further discloses a curable polymeric composition which is comprised of (1) from about 2 to about 50 parts by weight of a rubbery polymer which is comprised of repeat units which are comprised of (a) butyl acrylate, (b) at least one member selected from the group consisting of methyl methacrylate, ethyl methacrylate, methyl acrylate and ethyl acrylate, (c) acrylonitrile, (d) styrene, and (e) a crosslinking agent; (2) from about 50 to about 98 parts by weight of a hydrogenated nitrile rubber; and (3) a peroxide cure system.

DETAILED DESCRIPTION OF THE INVENTION

Conventional hydrogenated nitrile rubber can be used in making the polymeric compositions of this invention. The second component used in the blends of this invention is a rubbery polymer synthesized utilizing a free radical emulsion polymerization technique, such as the technique described in U.S. Pat. Nos. 5,380,785, 5,616,651, 5,674,933 or 5,767,173. The teachings of U.S. Pat. Nos. 5,380,785, 5,616,651, 5,674,933 and 5,767,173 are incorporated herein by reference in their entirety. Rubbery polymers of this type are sold by The Goodyear Tire & Rubber Company as Sunigum® rubber. These rubbery polymers are comprised of repeat units which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene, and (e) a crosslinking agent. The crosslinking agent is typically a multi-functional acrylate, a multi-functional methacrylate or divinylbenzene. Some specific examples of crosslinking agents which can be used include ethylene glycol methacrylate, divinylbenzene and 1,4-butanediol dimethacrylate.

Technically, the rubbery polymers used in the blends of this invention contain repeat units (chain linkages) which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene, and (e) a crosslinking agent. These repeat units differ from the monomers that they were derived from in that they contain one less carbon-to-carbon double bond than is present in the respective monomer. In other words, a carbon-to-carbon double bond is consumed during the polymerization of the monomer into a repeat unit in the rubbery polymer. Thus, in saying that the rubbery polymer contains various monomers, in actuality means that it contains repeat units that are derived from those monomers.

The rubbery polymers used in the blends of this invention will normally contain (a) from about 40 weight percent to about 80 weight percent butyl acrylate, or optionally a mixture of butyl acrylate and 2-ethylhexyl acrylate containing up to 40 weight percent 2-ethylhexyl acrylate, (b) from about 5 weight percent to about 35 weight percent methyl methacrylate, ethyl methacrylate, methyl acrylate or ethyl acrylate, (c) from about 4 weight percent to about 30 weight percent acrylonitrile, (d) from about 3 weight percent to about 25 weight percent styrene, and (e) from about 0.25 weight percent to about 8 weight percent of a crosslinking agent.

Such rubbery polymers will preferably contain (a) from about 50 weight percent to about 80 weight percent butyl acrylate, or optionally a mixture of butyl acrylate and 2-ethylhexyl acrylate containing up to about 40 percent 2-ethylhexyl acrylate, (b) from about 3 weight percent to about 25 weight percent of at least one member selected from the group consisting of methyl methacrylate, ethyl methacrylate, methyl acrylate and ethyl acrylate, (c) from about 6 weight percent to about 30 weight percent acrylonitrile, (d) from about 5 weight percent to about 18 weight percent styrene, and (e) from about 0.5 weight percent to about 4 weight percent of a crosslinking agent.

The rubbery polymers used in the polymeric compositions of this invention will more preferably be comprised of repeat units which are derived (a) from about 55 weight percent to about 75 weight percent butyl acrylate, or optionally a mixture of butyl acrylate and 2-ethylhexyl acrylate containing up to about 40 percent 2-ethylhexyl acrylate, (b) from about 5 weight percent to about 20 weight percent of at least one member selected from the group consisting of methyl methacrylate, ethyl methacrylate, methyl acrylate and ethyl acrylate, (c) from about 10 weight percent to about 25 weight percent acrylonitrile, (d) from about 8 weight percent to about 14 weight percent styrene, and (e) from about 1 weight percent to about 3 weight percent of a crosslinking agent. The percentages reported in this paragraph are based upon the total weight of the rubbery polymer.

The rubbery polymers used in the blends of the present invention are synthesized in an aqueous reaction mixture by utilizing a free radical polymerization technique. The reaction mixture utilized in this polymerization technique is comprised of water, the appropriate monomers, a suitable free radical initiator, a crosslinking agent, a surfactant selected from the group consisting of sulfonates and sulfate derivatives and a dispersant selected from the group consisting of aromatic formaldehyde condensation products and polycarboxylates. The reaction mixture utilized in this polymerization technique will normally contain from about 10 weight percent to about 80 weight percent monomers, based upon the total weight of the reaction mixture. The reaction mixture will preferably contain from about 20 weight percent to about 70 weight percent monomers and will more preferably contain from about 40 weight percent to about 50 weight percent monomers.

The reaction mixtures utilized in carrying out such polymerizations will typically contain from about 0.1 phm (parts per hundred parts of monomer by weight) to about 5 phm of at least one member selected from the group consisting of metal salts of alkyl sulfates and metal salts of alkyl sulfonates and from about 0.1 phm to about 5 phm of at least one dispersant selected from the group consisting of aromatic formaldehyde condensation products and polycarboxylates. It is generally preferred for the reaction mixture to contain from about 0.25 phm to about 4.25 phm of the metal salt of the alkyl sulfonate or the metal salt of the alkyl sulfate and from about 0.25 phm to about 4.25 phm of the dispersant selected from the group consisting of aromatic formaldehyde condensation products and polycarboxylates. It is normally more preferred for the reaction mixture to contain from about 0.4 phm to about 3.5 phm of the metal salt of the alkyl sulfonate or the metal salt of the alkyl sulfate and from about 0.4 phm to about 3.5 phm of the dispersant selected from the group consisting of aromatic formaldehyde condensation products and polycarboxylates.

The free radical polymerization technique utilized in the synthesis of the rubbery polymer is normally initiated by including a free radical initiator in the reaction mixture. Virtually, any type of compound capable of generating free radicals can be utilized as the free radical initiator. The free radical generator is normally employed at a concentration within the range of about 0.01 phm to about 1 phm. The free radical initiators which are commonly used include the various peroxygen compounds, such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds, such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like; and the various alkyl perketals, such as 2,2-bis-(t-butyl-peroxy)butane, and the like. Water-soluble peroxygen-free radical initiators are especially useful in such aqueous polymerizations.

The emulsion polymerization used in the synthesis of the rubbery polymer is typically carried out at the temperature ranging between about 60° F. (20° C.) and 190° F. (88° C.). At temperatures above about 88° C. alkyl acrylate monomers, such as butyl acrylate, have a tendency to boil. Thus, a pressurized jacket would be required for heating such alkyl acrylate monomers to temperatures in excess of about 88° C. On the other hand, at polymerization temperatures of less than about 55° C., a redox initiator system is required to insure satisfactory polymerization rates.

The sulfonates and sulfate derivatives that are useful as surfactants are commercially available from a wide variety of sources. For instance, DuPont sells sodium alkylarylsulfonate under the tradename Alkanol®, Browning Chemical Corporation sells sodium dodecylbenzene sulfonates under the tradename Ufaryl® DI-85 and Ruetgers-Nease Chemical Company sells sodium cumene sulfonate under the tradename Naxonate Hydrotrope®. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

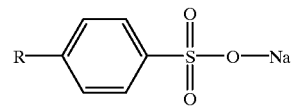

wherein R represents an alkyl group containing from 1 to about 20 carbon atoms. It is preferred for the alkyl group to contain from about 8 to about 14 carbon atoms.

The sulfonate surfactant can be a mixture of (mono) dialkylate ether disulfonates.

The advantage of the disulfonate structure is that it contains two ionic charges per molecule instead of one as is the case with conventional alkyl sulfonate surfactants. Mixtures of (mono)dialkylate ether disulfates which are useful in the practice of this invention are commercially available from a wide variety of sources. For instance, Dow Chemical sells Dowfax® alkylated disulfonated diphenyl oxides which are of the structural formula:

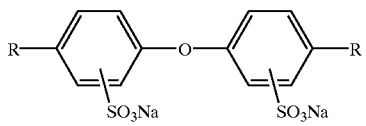

wherein R is an alkyl group which is typically —$C_6H_{13}$, —$C_{10}H_{21}$, —$C_{12}H_{25}$ or —$C_{16}H_{33}$. Sodium mono- and di-dodecyldiphenyloxide disulfonates are sold by American Cyanamid as DPOS-45 surfactants. Alpha-olefin sulfonate surfactants which are suitable for utilization in this invention are commercially available from Witco and Hoechst AG.

The sulfate surfactants which are useful include metal salts of alkylsulfates having the structural formula $ROSO_3X$ and metal salts of alkylethersulfates having the structural formula $RO(CH_2CH_2O)_nSO_3X$, wherein X represents a group Ia metal, such as sodium or potassium. Sodium lauryl sulfate, sodium ethanolamine lauryl sulfate and triethanolamine lauryl sulfate are representative examples of commercially available sulfate surfactants.

The dispersants utilized in the polymerization are normally either aromatic formaldehyde condensation products or polycarboxylates. The aromatic formaldehyde condensation products are normally polysulfonates which are the reaction product of aromatic compounds and formaldehyde. Such aromatic formaldehyde condensation product soaps can be made by a relatively simple process. For example, in such a process, 200 parts of naphthalene is reacted with 200 parts of 98 percent sulfuric acid for 5 hours at a temperature of about 165°. The solution made is then subsequently cooled and diluted with 90 parts of water. Then, 107 parts of a 30 percent formaldehyde solution is added and the mixture is stirred for 20 hours at a temperature of about 80° C. Toward the end of this reaction period, the mixture is gradually heated to 100° C. Neutralization is subsequently carried out at 20° C. to 25° C. with about 165 to 180 parts of a 25 percent ammonia solution. The neutralization product is then filtered and, if necessary, dried in a vacuum drier.

Numerous variations of this synthesis are possible, and a wide range of aromatic compounds and their derivatives can react with aldehydes, ketones and compounds that eliminate aldehyde groups. For example, (a) dispersants produced by condensation of aromatic sulfonic acids and benzyl chloride or benzoin, (b) dispersants produced by condensation of various alkylarylsulfonic acids with a halogen arylsulfonic acid; and (c) dispersants produced by condensation of sulfonated phenols or 2-naphthols with formaldehyde and various nitrogen compounds.

The carboxylate is also a water-soluble polymeric dispersing agent. For instance, methacrylic acid can be polymerized to yield water-soluble homopolymer which can be employed as a carboxylate dispersant. Copolymers with maleic acid, acrylic acid-maleic acid, maleic acid-methylvinyl ether and diisobutylene-maleic acid (DIBMA) are also very useful in the practice of this invention. Carboxylate dispersants are commercially available from a variety of sources.

The free radical emulsion polymerization utilized in synthesizing the rubbery polymer is typically conducted at a temperature which is within the range of about 10° C. to about 95° C. In most cases, the polymerization temperature utilized will vary between about 20° C. and about 80° C. The polymerization is carried out as a two-step batch process. In the first step, a seed polymer containing latex is synthesized. This is done by polymerizing (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile and (d) a crosslinking agent.

The seed polymer containing latex is typically prepared by the polymerization of a monomer mixture which contains about 40 to about 90 weight percent butyl acrylate, or optionally a mixture of butyl acrylate and 2-ethylhexyl acrylate containing up to about 40 percent 2-ethylhexyl acrylate, from about 5 to about 35 weight percent methyl methacrylate, ethyl methacrylate, methyl acrylate or ethyl acrylate, from about 2 to about 30 weight percent acrylonitrile and from about 0.25 weight percent to 6 weight percent of the crosslinking agent. It is typically preferred for the monomeric component utilized in the first step to include about 50 weight percent to about 85 weight percent butyl acrylate, or optionally a mixture of butyl acrylate and 2-ethylhexyl acrylate containing up to about 40 percent 2-ethylhexyl acrylate, from about 5 weight percent to about 30 weight percent ethyl acrylate, ethyl methacrylate, methyl acrylate or methyl methacrylate, from about 4 weight percent to about 28 weight percent acrylonitrile and from about 0.5 weight percent to about 4 weight percent of the crosslinking agent. It is generally more preferred for the monomer charge composition used in synthesizing the seed polymer latex to contain from about 60 weight percent to about 80 weight percent butyl acrylate, or optionally a mixture of butyl acrylate and 2-ethylhexyl acrylate containing up to about 40 percent 2-ethylhexyl acrylate, from about 5 weight percent to about 25 weight percent methyl methacrylate, ethyl methacrylate, methyl acrylate or ethyl acrylate, from about 5 weight percent to about 25 weight percent acrylonitrile and from about 1 to about 3 weight percent crosslinking agent.

After the seed polymer latex has been prepared, styrene monomer, additional acrylonitrile monomer and additional crosslinking agent is added to the seed polymer containing latex. As a general rule, from about 4 parts by weight to about 30 parts by weight of styrene, from about 1 part by weight to about 20 parts by weight of additional acrylonitrile and from about 0.01 to 2 parts by weight of the crosslinking agent will be added. In this second stage of the polymerization, it is preferred to add from about 6 parts by weight to about 22 parts by weight of styrene, from about 3 parts by weight to about 12 parts by weight of acrylonitrile and from about 0.05 parts by weight to 1 part by weight of the crosslinking agent. It is typically more preferred for from about 10 parts by weight to about 17 parts by weight of styrene, from about 4 parts by weight to about 8 parts by weight of acrylonitrile and from about 0.1 parts by weight to about 0.5 parts by weight of the crosslinking agent to be added to the seed polymer latex to initiate the second phase of the polymerization.

A wide variety of crosslinking agents can be utilized in carrying out the polymerizations used in the synthesis of the rubbery polymer. Some representative examples of crosslinking agents which can be utilized include difunctional acrylates, difunctional methacrylates, trifunctional acrylates, trifunctional methacrylates and divinylbenzene. A crosslinking agent that has proven to be particularly useful is 1,4-butanediol dimethacrylate.

In most cases, the polymerization will be continued until a high monomer conversion has been attained. After the polymerization has been completed, it is normally desirable to add an aminoalcohol to the emulsion to deodorize the latex. The aminoalcohol will generally be of the structural formula HO—A—$NH_2$, wherein A represents an alkylene group which contains from 2 to about 20 carbon atoms. It is normally preferred for the aminoalcohol to contain from 2 to about 10 carbon atoms with amino alcohols which contain from 2 to about 5 carbon atoms being most preferred. Ethanolamine (HO—$CH_2$—$CH_2$—$NH_2$) which is also known as 2-aminoethanol and 2-hydroxyethylamine is a representative example of a highly preferred aminoalcohol. Some additional examples of preferred aminoalcohols include 3-aminopropanol, 4-aminobutanol, 2-amino-2-methyl-1-propanol, 2-amino-2-ethyl-1,3-propanediol, N-methyl-2,2-iminoethanol and 5-aminopentanol.

This deodorizing step will be carried out under conditions which allow for the aminoalcohol to react with residual n-butylacrylate and acrylonitrile which is present in the emulsion. This reaction will proceed over a broad temperature range and the deodorizing step can be conducted at any temperature which is within the range of about 5° C. and about 95° C. However, for practical reasons, the deodorizing step will normally be carried out at a temperature which is within the range of about 20° C. to about 70° C. Since the reaction is faster at higher temperatures, the amount of reaction time needed will decrease with increasing temperature. For instance, at a temperature of about 20° C., a residence time in the deodorizing step of one to three days may be required. On the other hand, at a temperature of about 65° C., only about two hours of reaction time is normally required.

The amount of time required for the aminoalcohol to react with the residual n-butylacrylate monomer and residual acrylonitrile monomer will also depend upon the level of aminoalcohol utilized. As a general rule, from about 0.05 weight percent to about 2 weight percent of the aminoalcohol will be added, based upon the total weight of the emulsion. More typically, from about 0.1 weight percent to about 1.5 weight percent of the aminoalcohol will be added. It is normally preferred to utilize from about 0.3 weight percent to about 1 weight percent of the aminoalcohol.

The rubbery polymer made by the two-step batch polymerization process is recovered from the emulsion (latex) after the optional deodorizing step. This can be accomplished by utilizing standard coagulation techniques. For instance, coagulation can be accomplished by the addition of salts, acids or both to the latex.

After the rubbery polymer is recovered by coagulation, it can be washed to further reduce odors. This can be accomplished by simply pouring or spraying water on the rubbery polymer. The rubbery polymer can also be washed by putting it in a water bath which will further reduce odor. After being washed, the rubbery polymer is generally dried.

It is sometimes advantageous to convert the dry rubbery polymer into a powder to facilitate its usage. In this case, it will be beneficial to add a partitioning agent to the rubbery polymer. Some representative examples of partitioning agents that can be employed include calcium carbonate, emulsion polyvinyl chloride and silica. Calcium carbonate is a highly desirable partitioning agent that can be utilized in such applications.

The rubbery polymer is then blended with a hydrogenated nitrile rubber to make the magnet compositions of this invention. These blends can be prepared by blending the rubbery polymer with the hydrogenated nitrile rubber utilizing standard mixing techniques. It is highly preferred for the rubbery polymer to be in powdered form when blended into the hydrogenated nitrile rubber to make the blends of this invention.

The polymeric compositions of this invention will typically contain from about 2 parts by weight to about 50 parts by weight of the rubbery polymer and from about 50 part by weight to about 98 parts by weight of the hydrogenated nitrile rubber. The polymeric compositions of this invention will preferably contain from about 15 parts by weight to about 40 parts by weight of the rubbery polymer and from about 60 part by weight to about 85 parts by weight of the hydrogenated nitrile rubber. The polymeric compositions of this invention will more preferably contain from about 20 parts by weight to about 30 parts by weight of the rubbery polymer and from about 70 part by weight to about 80 parts by weight of the hydrogenated nitrile rubber.

The polymeric compositions of this invention can also include fillers, such as carbon black and/or silica. Such fillers can be present in amounts of up to about 150 phr (parts by weight per 100 parts by weight of rubber). Fillers will typically be present in amounts of about 20 phr to about 100 phr. Processing oils can also be included in the blends of this invention. Processing oils will typically be present in amounts ranging from about 2 phr to about 50 phr. Processing oils will more typically be present at a level which is within the range of about 5 phr to about 20 phr. The polymeric compositions of this invention can also optionally contain 0 to 10 phr of tackifier resins, 0 to 10 phr of reinforcing resin, 0 to 10 phr of fatty acids, 0 to 2.5 phr of peptizers, 0 to 2.5 phr of an antidegradant, and 0 to 1 phr of a scorch inhibiting agent.

The blends of this invention can be cured with sulfur or peroxide cure systems. Sulfur cure systems will typically contain sulfur and/or a sulfur containing compound, at least one accelerator, zinc oxide, optionally, a tackifier resin, optionally a reinforcing resin, optionally one or more fatty acids, optionally a peptizer, and optionally one or more scorch inhibiting agents. Such blends will typically contain from about 0.5 phr to about 5 phr of sulfur and/or a sulfur-containing compound. It is typically preferred for the sulfur to be present at a level which is within the range of 1 phr to 2.5 phr. It may be desirable to utilize insoluble sulfur in cases where bloom is a problem.

To attain high tensile strength it is desirable to cure the rubber compound with peroxide cure system. A wide variety of peroxygen compounds can be used to cure the polymeric blends of this invention. Some representative examples of peroxygen compounds that can be used include potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds, such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like. The peroxygen compound will typically be employed in the peroxide cure system at a level which is within the range of about 0.5 phr to about 10 phr. The peroxygen compound will more typically be employed at a level of about 1 phr to about 6 phr. A coagent can optionally be included in the peroxide cure system.

This invention is illustrated by the following examples. These examples are merely for the purpose of illustration and are not to be regarded as limiting the scope of this invention or the manner in which it can be practiced. Unless specifically indicated otherwise, all parts and percentages are given by weight.

EXAMPLE 1

In this experiment, a rubbery polymer suitable for use in the magnet compositions of this invention was synthesized. The polymerization was conducted in a reactor having a capacity of 100 liters. The reactor was equipped with an axially flow turbine agitator which was operated at 110 rpm (revolutions per minute).

The reactor was charged with 74.6 kg (kilograms) of water, 0.92 kg of a half ester maleate soap (made with $C_{16}$ fatty alcohol), 0.31 kg of a 50 percent aqueous potassium hydroxide solution, 0.062 kg of sodium dodecylbenzene sulfonate, 18.0 kg of n-butylacrylate, 2.6 kg of acrylonitrile, 5.1 kg of methylacrylate, 0.38 kg of 1,4-butane diol dimethacrylate, 0.078 kg of t-dodecylmercaptan and 0.058 kg of potassium persulfate. A temperature of about 60° C was maintained throughout the polymerization. When a total solids content of about 25 percent was achieved, 0.025 kg of additional potassium persulfate was added. This first stage of the polymerization was carried out for a period of about 2½ hours. This first stage polymerization resulted in the production of a seed polymer latex which was used in the second step of the polymerization.

In the second step of the polymerization, 1.47 kg of acrylonitrile, 3.4 kg of styrene, 0.050 kg of divinylbenzene and 0.009 kg of t-dodecylmercaptan were charged into the reactor containing the seed polymer latex. The polymerization proceeded until a solids content of about 30 percent was attained. The latex produced was white in color, had a pH of about 6.5, had a Brookfield viscosity of about 6 centipoise (CPS), a surface tension of about 49 dyne per centimeter and a particle size of about 80 nanometers. However, the latex had a residual acrylonitrile concentration of about 1480 ppm (parts per million), a residual n-butylacrylate concentration of about 325 ppm and had a strong odor. Residual monomer levels were determined by gas chromatography.

The latex made was subsequently coagulated and a dry rubber was recovered. The dry rubber was determined by gas chromatography to contain 24 ppm of residual acrylonitrile and 300 ppm of n-butylacrylate. The dry rubber had an undesirable odor.

The rubbery polymer made was also tested for fogging characteristics. In the procedure used, the condensate from a 10-gram sample maintained at 100° C. was captured for 16 hours on a cooled aluminum foil that was supported on a glass plate. After the 16 hour period, it was determined gravimetrically that about 4 mg of condensate had formed.

EXAMPLE 2

In this experiment, a rubbery polymer was synthesized utilizing a procedure similar to the procedure employed in Example 1. This polymerization was conducted in a reactor having a capacity of 100 liters. The reactor was equipped with an axially flow turbine agitator which was operated at 110 rpm. The reactor was initially charged with 70.92 kg of water, 0.87 kg of dodecanol monomaleate, 0.40 kg of an aqueous 50 percent solution of potassium hydroxide, 0.06 kg of sodium dodecylbenzene sulfonate, 0.06 kg of sodium pyrophosphate, 0.05 kg of triethanol amine, 22.13 kg of n-butyl acrylate, 2.60 kg of acrylonitrile, 1.30 kg of methyl methacrylate, 0.65 kg of 1,4-butanediol dimethacrylate, 0.08 kg of t-dodecylmercaptan and 1.56 kg of a 5 percent solution of potassium persulfate. A temperature of about 35° C. was maintained throughout the polymerization. When a total solids content of about 24 percent was achieved, 0.52 kg of additional potassium persulfate solution was added. This first stage of the polymerization was carried out for a period of about 2½ hours. This first stage polymerization resulted in the production of a seed polymer latex which was used in the second step of the polymerization.

In the second step of the polymerization, 1.49 kg of acrylonitrile, 3.47 kg of styrene, 0.050 kg of divinylbenzene and 9.3 mg of t-dodecylmercaptan were charged into the reactor containing the seed polymer latex. The polymerization temperature was then raised to 70° C. and the polymerization was allowed to continue. After the polymerization was completed, the latex made was coagulated and a dry rubber was recovered.

EXAMPLE 3

In this experiment, a rubbery polymer was made in a 2-liter glass reactor. In the procedure employed, 1126 g of water, 5.93 g of a 50 percent aqueous potassium hydroxide solution, 14.0 g of hexadecyl monomaleate, 1.0 g of a 30 percent solution of sodium dodecylbenzene sulfonate, 1.0 g of sodium pyrophosphate, 231 g of n-butyl acrylate, 105 g of acrylonitrile, 42 g of 2-ethylhexylacrylate, 42 g of methyl acrylate, 8.4 g of 1,4-butanediol dimethacrylate, 0.84 g of t-dodecylmethacrylate, 8.3 g of a 5 percent aqueous solution of triethanol amine and 24.9 g of a 5 percent aqueous solution of potassium persulfate were initially charged into the reactor. A temperature of about 35° C. was maintained during the first stage of the polymerization. When a solids content of about 20 percent was reached, the reaction temperature was increased to about 60° C. and 24 g of additional acrylonitrile, 56 g of styrene, 0.96 g of divinylbenzene and 0.16 g of t-dodecylmercaptan were charged into the reactor. After the polymerization was completed, the latex made was coagulated and a rubber was recovered.

EXAMPLE 4

In this experiment, a rubbery polymer was made in a 2-liter glass reactor. In the procedure employed, 1126 g of water, 5.93 g of a 50 percent aqueous potassium hydroxide solution, 14.0 g of hexadecyl monomaleate, 1.0 g of a 30 percent solution of sodium dodecylbenzene sulfonate, 1.0 g of sodium pyrophosphate, 168 g of n-butyl acrylate, 105 g of acrylonitrile, 105 g of 2-ethylhexylacrylate, 42 g of methyl acrylate, 6.3 g of 1,4-butanediol dimethacrylate, 0.44 g of t-dodecylmethacrylate, 8.3 g of a 5 percent aqueous solution of triethanol amine and 24.9 g of a 5 percent aqueous solution of potassium persulfate were initially charged into the reactor. A temperature of about 35° C. was maintained during the first stage of the polymerization. When a solids content of about 20 percent was reached, the reaction temperature was increased to about 60° C. and 24 g of additional acrylonitrile, 56 g of styrene, 0.96 g of divinylbenzene and 0.16 g of t-dodecylmercaptan were charged into the reactor. After the polymerization was completed, the latex made was coagulated and a rubber was recovered.

EXAMPLE 5

In this experiment, the latex made in Example 1 was deodorized before being coagulated. This was accomplished by adding 0.5 weight percent (based upon the total weight of the latex) of ethanolamine to the latex at room temperature (about 22° C.). After one day, the level of residual acrylonitrile dropped from 1480 ppm to 51 ppm and the level of residual n-butylacrylate dropped from 325 ppm to 30 ppm.

After three days, the level of residual n-butylacrylate became undetectable.

The deodorized latex was subsequently coagulated and a dry rubber was recovered. Residual levels of acrylonitrile and n-butylacrylate were too low to be detectible by gas chromatography in the dry rubber. The dry rubber recovered did not have an undesirable odor.

EXAMPLE 6

In this experiment, the procedure described in Example 1 was repeated except that the 0.92 kg of half ester maleate soap was replaced with 0.612 kg of an aromatic formaldehyde condensation product soap. The procedure employed in this experiment also differed from the procedure described in Example 1 in that the level of sodium dodecyl benzene sulfonate was increased to 0.3 kg. The aromatic formaldehyde condensation product soap utilized in this experiment was the sodium salt of the condensation product of naphthalene sulfonic acid and formaldehyde. It had a molecular weight that was within the range of about 1000 to about 5000 and can be represented by the structural formula:

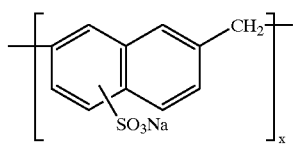

The rubbery polymer made was then tested for fogging characteristics. In the procedure used, the condensate from a 10-gram sample maintained at 100° C. was captured for 16 hours on a cooled aluminum foil that was supported on a glass plate. After the 16 hour period, it was determined gravimetrically that 0.3 mg of condensate had formed. Thus, the fogging characteristics of the rubbery polymer made in this experiment were much better than the fogging characteristics of the rubbery polymer synthesized in Example 1 where 4.0 mg of condensate were collected in the fogging test. In other words, the rubbery polymer made in this experiment generated less than 10 percent of the amount of fog generated with the rubbery polymer of Example 1.

EXAMPLE 7

In this experiment, the procedure described in Example 1 was repeated except that the 0.92 kg of half ester maleate soap was replaced with 0.765 kg of an Sokalan polycarboxylate soap. The procedure employed in this experiment also differed from the procedure described in Example 1 in that the level of sodium dodecyl benzene sulfonate was increased to 0.306 kg.

The rubbery polymer made was then tested for fogging characteristics. In the procedure used, the condensate from a 10-gram sample maintained at 100° C. was captured for 16 hours on a cooled aluminum foil which was supported on a glass plate. After the 16 hour period, it was determined gravimetrically that 0.4 mg of condensate had formed. Thus, the fogging characteristics of the rubbery polymer made in this experiment were much better than the fogging characteristics of the rubbery polymer synthesized in Example 1.

EXAMPLES 8–11

In this experiment, blends of 75 parts by weight of Zetpol 2020 hydrogenated nitrile rubber with 25 parts by weight of Sunigum® rubber were prepared (Examples 10–11) and compared with controls that contained only the Zetpol 2020 hydrogenated nitrile rubber (Examples 8–9). In the procedure used a non-productive compound (a blend that does not contain any curative) was prepared and then a productive compound (a blend that contains a curative) was prepared. The ingredients used in making the blends and some of the physical properties of the blends made are shown in Table I. It should be noted that Vanox ZMTI is the zinc salt of 4-methylmercaptobenzimidazole and 5-methylmercaptobenzimidazole. Varox DCP-40KE is 40% active dicumyl peroxide. Captax is 2-mercaptobenzothiazole. Methyl Tuads is tetramethylthiuram disulfide ultra accelerator.

TABLE I

| HNBR/SUNIGUM ® | | | | |
|---|---|---|---|---|
| Ingredient | 8 | 9 | 10 | 11 |
| Zetpol 2020 HNBR | 100 | 100 | 75 | 75 |
| Sunigum ® | 0 | 0 | 25 | 25 |
| Stearic Acid | 1 | 1 | 1 | 1 |
| Carbon Black N762 | 40 | 40 | 40 | 40 |
| Adipate Plasticizer | 15 | 15 | 15 | 15 |
| Agerite Resin D | 1 | 1 | 1 | 1 |
| Vanox ZMTI | 1 | 1 | 1 | 1 |
| Non-Productive | 158 | 158 | 158 | 158 |
| Non-Productive | 158 | 158 | 158 | 158 |
| Kadox-911C Zinc Oxide | 5 | 0 | 0 | |
| Sulfur | 0.5 | 0 | 0.5 | 0 |
| Methyl TUADS | 2 | 0 | 2 | 0 |
| Captax (MBT) | 0.5 | 0 | 0.5 | 0 |
| Varox DCP-40KE | 0 | 7 | 0 | 7 |
| Metallic Diacrylate | 0 | 20 | 0 | 20 |
| Total Parts | 166 | 185 | 166 | 185 |
| Mooney Scorch | | | | |
| Minimum Viscosity | 19.4 | 20.2 | 18.1 | 17.5 |
| Time to 10 pt rise, or | 0 | 10 | 0 | 7.3 |
| rise @ 20 min | 25.3 | | 19.9 | |
| CONDITIONS: Temperature 250 F. (121 C.); Rotor Size: Small | | | | |
| Rhoemeter - ODR | | | | |
| Max Torque (MH) | 43.3 | 52.4 | 35.8 | 49.7 |
| Min Torque (ML) | 6.3 | 10.9 | 6.2 | 12.3 |
| tc 50 | 2.75 | 2.85 | 2.95 | 2.65 |
| tc 90 | 4.8 | 7.9 | 5.6 | 7.35 |
| ts 1 | 1.7 | 1.05 | 1.9 | 1.05 |
| CONDITIONS: Motor 30 Min; Arc: 1 degree: Preheat 0 min; Frequency: 100; Range: 0.100; Temperature: 338 F. (170 C.) | | | | |
| Tensile & Elongation - Original | | | | |
| Tensil @ break, psi | 3774 | 3344 | 1990 | 2070 |
| Elongation @ break, % | 578 | 532 | 516 | 472 |
| 100% Modulus, psi | 229 | 449 | 254 | 532 |
| 300% Modulus, psi | 748 | 1845 | 746 | 1542 |
| 500% Modulus, psi | 1901 | 3132 | 1773 | 0 |
| Shore A Hardness | 59 | 71 | 60 | 74 |
| CONDITIONS: X-Head Speed: 20 in/min; Die: Die C. | | | | |
| Air Oven Aging - T&E - 70 Hrs. @ 250 F. | | | | |
| Tensile @ break, psi | 3389 | 3992 | 1990 | 2343 |
| Elongation @ break,% | 450 | 480 | 385 | 369 |
| 100% Modulus, psi | 341 | 590 | 424 | 775 |
| 300% Modulus, psi | 1512 | 2536 | 1456 | 2087 |
| Shore A Hardness | 64 | 75 | 67 | 80 |
| Tensile, % change | −10.2 | 19.38 | 0 | 13.19 |
| Elongation, % change | −22.1 | −9.77 | −25.4 | −21.8 |
| Hardness, point change | 5 | 4 | 7 | 6 |
| CONDITIONS: X-Head Speed: 20/in/min; Die: Die C. | | | | |
| Air Oven Aging - T&E - 168 Hrs. @ 250 F. | | | | |
| Tensile @ break, psi | 3876 | 4019 | 2274 | 2568 |
| Elongation @ break, % | 474 | 422 | 404 | 378 |
| 100% Modulus, psi | 361 | 716 | 444 | 865 |

TABLE I-continued

HNBR/SUNIGUM ®

| Ingredient | 8 | 9 | 10 | 11 |
|---|---|---|---|---|
| 300% Modulus, psi | 1723 | 2955 | 1614 | 2272 |
| Shore A Hardness | 66 | 78 | 68 | 82 |
| Tensile, % change | 2,703 | 20.19 | 14.27 | 24.06 |
| Elongation, % change | −18 | −20.7 | −21.7 | −19.9 |
| Hardness, point change | 7 | 7 | 8 | 8 |
| CONDITIONS: X-Head Speed: 20 in/min; Die: Die C. | | | | |
| Air Oven Aging - T&E - 168 Hrs. @ 300 F. | | | | |
| Tensile @ break, psi | 2561 | 3455 | 2246 | 2646 |
| Elongation @ break, % | 244 | 238 | 208 | 192 |
| 100% Modulus, psi | 870 | 1396 | 1177 | 1692 |
| 300% Modulus, psi | 0 | 0 | 0 | 0 |
| Shore A Hardness | 76 | 83 | 80 | 89 |
| Tensile, % change | −32.1 | 3.319 | 12.86 | 27.83 |
| Elongation, % change | −57.8 | −55.3 | −59.7 | −59.3 |
| Hardness, point change | 17 | 12 | 20 | 15 |
| CONDITIONS: X-Head Speed: 20 in/min; Die: Die C. | | | | |
| Fluid Immersion - T&E - 168 Hrs. (@ 300 F./IRM #903 Oil | | | | |
| 100% Modulus, psi | 164 | 503 | 239 | 646 |
| 300% Modulus, psi | 433 | 2178 | 695 | 1837 |
| Elongation @ break, % | 626 | 415 | 600 | 316 |
| Shore A Hardness | 57 | 70 | 60 | 74 |
| Tensile @ break, psi | 1489 | 3089 | 1420 | 1891 |
| % Volume Swell | 7.71 | 7.27 | 8.66 | 7.42 |
| Tensile, % change | −60.5 | −7.63 | −28.6 | −8.65 |
| Elongation, % change | 8.3 | −22 | 16.3 | −33.1 |
| Hardness, point change | −2 | −1 | 0 | 0 |
| CONDITIONS: Speed: 20 in/min; Die: Die C. | | | | |

EXAMPLES 12–17

In this series of experiments blends containing 75 parts of Zetpol 2020 hydrogenated nitrile rubber and 25 parts of Sunigum® rubber were prepared and cured using the general procedure described in Examples 8–11. The ingredients used in making each of the blends in this series of experiments and the some of the physical properties of cured blends are shown in Table II. It should be noted that Perkadox 14-40 K is 40% active di-(tert-butylperoxyisopropyl) benzene. Seret 515 is an acrylic ester crosslinking agent and Seret 516 is a difunctional liquid acrylic coagent.

TABLE II

HNBR/SUNIGUM ® PEROXIDE CURE STUDY

| Ingredient | 12 | 13 | 14 | 15 | 16 |
|---|---|---|---|---|---|
| Zetpol 2020 | 75 | 75 | 75 | 75 | 75 |
| Sunigum ® | 25 | 25 | 25 | 25 | 25 |
| Carbon Black N762 | 40 | 40 | 40 | 40 | 40 |
| Adipate Plasticizer | 15 | 15 | 15 | 15 | 15 |
| Non-Productive | 155 | 155 | 155 | 155 | 155 |
| Non-Productive | 155 | 155 | 155 | 155 | 155 |
| Dicumyl Peroxide Di-Cup 40 C. | 5 | 5 | 5 | 10 | 0 |
| Perkadox 14-40K-PD | 0 | 0 | 0 | 0 | 5 |
| Saret 516 Coagent | 0 | 10 | 0 | 10 | 0 |
| Saret 515 | 0 | 0 | 10 | 0 | 0 |
| Total Parts | 160 | 170 | 170 | 175 | 160 |
| Rheometer - ODR | | | | | |
| Max Torque (MH) | 30.7 | 18.7 | 40.8 | 32.7 | 36.8 |
| Min Torque (ML) | 6.3 | 3.2 | 3.4 | 3.6 | 5.8 |

TABLE II-continued

HNBR/SUNIGUM ® PEROXIDE CURE STUDY

| Ingredient | 12 | 13 | 14 | 15 | 16 |
|---|---|---|---|---|---|
| tc 50 | 2.15 | 2.85 | 1.9 | 2.7 | 2.6 |
| tc 90 | 45 | 6.8 | 4.15 | 545 | 6.75 |
| ts 1 | 1.1 | 1.3 | 1.15 | 1.1 | 1.1 |
| CONDITIONS: Motor: 60 min; Arc: 1 Degree; Preheat: 0 Min.; Frequency: 100; Range: 0–100; Temperature: 350 F. | | | | | |
| Tensile & Elongation - Original | | | | | |
| Tensile @ break, psi | 2638 | 1961 | 2401 | 2398 | 2849 |
| Elongation @ break, % | 469 | 606 | 305 | 378 | 385 |
| 100% Modulus, psi | 237 | 191 | 527 | 325 | 315 |
| 300% Modulus, psi | 1423 | 731 | 2179 | 1850 | 2036 |
| Shore A Hardness | 56 | 57 | 67 | 59 | 58 |
| CONDITIONS: X-Head Speed: 20 in/min; Die: Die C. | | | | | |

EXAMPLES 18–22

In this series of experiments blends containing 50 parts of Zetpol 2020 hydrogenated nitrile rubber and 50 parts of Sunigum® rubber were prepared and cured using the general procedure described in Examples 8–11. The ingredients used in making each of the blends in this series of experiments and the some of the physical properties of cured blends are shown in Table III. It should be noted that Perkadox 14-40 K is 40% active di-(tert-butylperoxyisopropyl) benzene. Seret 515 is an acrylic ester crosslinking agent and Seret 516 is a difunctional liquid acrylic coagent.

TABLE III

HNBR/SUNIGUM ® PEROXIDE CURE STUDY

| Ingredient | 18 | 19 | 20 | 21 | 22 |
|---|---|---|---|---|---|
| Zetpol 2020 | 50 | 50 | 50 | 50 | 50 |
| Sunigum ® | 50 | 50 | 50 | 50 | 50 |
| Carbon Black N762 | 40 | 40 | 40 | 40 | 40 |
| Adipate Plasticizer | 15 | 15 | 15 | 15 | 15 |
| Non-Productive | 155 | 155 | 155 | 155 | 155 |
| Non-Productive | 155 | 155 | 155 | 155 | 155 |
| Dicumyl Peroxide Di-Cup 40 | 10 | 0 | 0 | 0 | 0 |
| Perkadox 14-40K-PD | 0 | 5 | 5 | 5 | 10 |
| Saret 516 Coagent | 10 | 0 | 10 | 0 | 0 |
| Saret 515 | 0 | 0 | 0 | 10 | 10 |
| Total Parts | 175 | 160 | 170 | 170 | 175 |
| Rheometer - ODR | | | | | |
| Max Torque (MH) | 26.4 | 26.1 | 24.7 | 36.5 | 46.9 |
| Min Torque (ML) | 3.8 | 5.7 | 3.1 | 2.6 | 5.3 |
| tc 50 | 2.65 | 2.5 | 4.25 | 1.65 | 1.3 |
| tc 90 | 5.15 | 6.1 | 9.8 | 3.3 | 2.5 |
| ts 1 | 1.05 | 1.15 | 1.35 | 1.35 | 1.1 |
| CONDITIONS: Motor: 60 min; Arc: 1 Degree; Preheat: 0 Min.; Frequency: 100; Range: 0–100; Temperature: 350 F. | | | | | |
| Tensile & Elongation - Original | | | | | |
| Tensile @ break, psi | 1543 | 1608 | 1469 | 1805 | 1722 |
| Elongation @ break, % | 252 | 280 | 280 | 161 | 101 |
| 100% Modulus, psi | 447 | 341 | 404 | 1070 | 0 |
| 300% Modulus, psi | 0 | 0 | 0 | 0 | 0 |
| Shore A Hardness | 63 | 58 | 62 | 76 | 80 |
| CONDITIONS: X-Head Speed: 20 in/min; Die: Die C. | | | | | |

While certain representative embodiments and details have been shown for the purpose of illustrating the subject invention, it will be apparent to those skilled in this art that various changes and modifications can be made therein without departing from the scope of the subject invention.

What is claimed is:

1. A polymeric composition having excellent heat and oil resistance which is comprised of (1) from about 2 to about 50 parts by weight of a rubbery polymer which is comprised of repeat units which are comprised of (a) butyl acrylate, (b) at least one member selected from the group consisting of methyl methacrylate, ethyl methacrylate, methyl acrylate and ethyl acrylate, (c) acrylonitrile, (d) styrene, and (e) a crosslinking agent; and (2) from about 50 to about 98 parts by weight of a hydrogenated nitrile rubber.

2. A polymeric composition as specified in claim 1 wherein the rubbery polymer is present at a level which is within the range of about 15 parts by weight to about 40 parts by weight, and wherein the hydrogenated nitrile rubber is present at a level which is within the range of about 60 parts by weight to about 85 parts by weight.

3. A polymeric composition as specified in claim 1 wherein the rubbery polymer is present at a level which is within the range of about 20 parts by weight to about 30 parts by weight, and wherein the hydrogenated nitrile rubber is present at a level which is within the range of about 70 parts by weight to about 80 parts by weight.

4. A polymeric composition as specified in claim 1 which is further comprised of a peroxide curing agent.

5. A polymeric composition as specified in claim 1 wherein the rubbery polymer is comprised of repeat units which are derived from about 40 to about 80 weight percent butylacrylate, from about 5 to about 35 weight percent of a member selected from the group consisting of methyl methacrylate, ethyl methacrylate, methyl acrylate and ethyl acrylate, from about 4 to about 30 weight percent acrylonitrile, from about 3 to about 25 weight percent styrene and from about 0.25 to about 8 weight percent crosslinking agent.

6. A polymeric composition as specified in claim 5 wherein the crosslinking agent is selected from the group consisting of difunctional acrylates, trifunctional acrylates, difunctional methacrylates, trifunctional methacrylates and divinylbenzene.

7. A polymeric composition as specified in claim 6 wherein the rubbery polymer contains repeat units which are derived from about 50 to about 80 weight percent butylacrylate, or optionally a mixture of butyl acrylate and 2-ethylhexyl acrylate containing up to about 40 percent 2-ethylhexyl acrylate, from about 3 to about 25 weight percent of a member selected from the group consisting of methyl methacrylate, ethyl methacrylate, methyl acrylate and ethyl acrylate, from about 6 to about 25 weight percent acrylonitrile, from about 5 to about 18 weight percent styrene and from about 0.5 to about 4 weight percent crosslinking agent.

8. A polymeric composition as specified in claim 6 wherein the rubbery polymer is comprised of repeat units which are derived from 55 to about 75 weight percent butyl acrylate, or optionally a mixture of butyl acrylate and 2-ethylhexyl acrylate containing up to about 40 percent 2-ethylhexyl acrylate, from about 5 to about 20 weight percent methylmethacrylate, from about 10 to about 14 weight percent acrylonitrile, from about 8 to about 14 weight percent styrene and from about 1 to about 3 weight percent crosslinking agent.

9. A polymeric composition as specified in claim 8 wherein the crosslinking agent is one or more members selected from the group consisting of divinylbenzene and 1,4-butanediol dimethacrylate.

10. A polymeric composition as specified in claim 2 wherein the rubbery polymer is present at a level which is within the range of about 15 parts by weight to about 40 parts by weight, and wherein the hydrogenated nitrile rubber is present at a level which is within the range of about 60 parts by weight to about 85 parts by weight.

11. A polymeric composition as specified in claim 10 wherein the crosslinking agent is selected from the group consisting of difunctional acrylates, trifunctional acrylates, difunctional methacrylates, trifunctional methacrylates and divinylbenzene.

12. A polymeric composition as specified in claim 11 wherein the rubbery polymer contains repeat units which are derived from about 50 to about 80 weight percent butylacrylate, or optionally a mixture of butyl acrylate and 2-ethylhexyl acrylate containing up to about 40 percent 2-ethylhexyl acrylate, from about 3 to about 25 weight percent of a member selected from the group consisting of methyl methacrylate, ethyl methacrylate, methyl acrylate and ethyl acrylate, from about 6 to about 25 weight percent acrylonitrile, from about 5 to about 18 weight percent styrene and from about 0.5 to about 4 weight percent crosslinking agent.

13. A polymeric composition as specified in claim 12 wherein the rubbery polymer is comprised of repeat units which are derived from 55 to about 75 weight percent butyl acrylate, or optionally a mixture of butyl acrylate and 2-ethylhexyl acrylate containing up to about 40 percent 2-ethylhexyl acrylate, from about 5 to about 20 weight percent methylmethacrylate, from about 10 to about 14 weight percent acrylonitrile, from about 8 to about 14 weight percent styrene and from about 1 to about 3 weight percent crosslinking agent.

14. A polymeric composition as specified in claim 13 wherein the crosslinking agent is one or more members selected from the group consisting of divinylbenzene and 1,4-butanediol dimethacrylate.

15. A polymeric composition as specified in claim 4 wherein the rubbery polymer is comprised of repeat units which are derived from about 40 to about 80 weight percent butylacrylate, from about 5 to about 35 weight percent of a member selected from the group consisting of methyl methacrylate, ethyl methacrylate, methyl acrylate and ethyl acrylate, from about 4 to about 30 weight percent acrylonitrile, from about 3 to about 25 weight percent styrene and from about 0.25 to about 8 weight percent crosslinking agent.

16. A polymeric composition as specified in claim 15 wherein the crosslinking agent is selected from the group consisting of difunctional acrylates, trifunctional acrylates, difunctional methacrylates, trifunctional methacrylates and divinylbenzene.

17. A polymeric composition as specified in claim 16 wherein the rubbery polymer contains repeat units which are derived from about 50 to about 80 weight percent butylacrylate, or optionally a mixture of butyl acrylate and 2-ethylhexyl acrylate containing up to about 40 percent 2-ethylhexyl acrylate, from about 3 to about 25 weight percent of a member selected from the group consisting of methyl methacrylate, ethyl methacrylate, methyl acrylate and ethyl acrylate, from about 6 to about 25 weight percent acrylonitrile, from about 5 to about 18 weight percent styrene and from about 0.5 to about 4 weight percent crosslinking agent.

18. A polymeric composition as specified in claim 16 wherein the rubbery polymer is comprised of repeat units which are derived from 55 to about 75 weight percent butyl acrylate, or optionally a mixture of butyl acrylate and 2-ethylhexyl acrylate containing up to about 40 percent 2-ethylhexyl acrylate, from about 5 to about 20 weight percent methylmethacrylate, from about 10 to about 14 weight percent acrylonitrile, from about 8 to about 14 weight percent styrene and from about 1 to about 3 weight percent crosslinking agent.

19. A polymeric composition as specified in claim 18 wherein the crosslinking agent is one or more members selected from the group consisting of divinylbenzene and 1,4-butanediol dimethacrylate.

20. A polymeric composition as specified in claim 19 wherein the peroxide cure system is comprised of a peroxygen compound selected from the group consisting of potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds, such as 2-t-butylazo-2-cyanopropane, dimethyl azodiisobutyrate, azodiisobutylronitrile, 2-t-butylazo-1-cyanocyclohexane, and 1-t-amylazo-1-cyanocyclohexane.

\* \* \* \* \*